(12) United States Patent
Curiger et al.

(10) Patent No.: US 6,330,668 B1
(45) Date of Patent: Dec. 11, 2001

(54) INTEGRATED CIRCUIT HAVING HARDWARE CIRCUITRY TO PREVENT ELECTRICAL OR THERMAL STRESSING OF THE SILICON CIRCUITRY

(75) Inventors: Andreas Curiger, Dallas; Wendell L. Little, deceased, late of Denton, both of TX (US), by Ann Little, legal representative

(73) Assignee: Dallas Semiconductor Corporation, Dallas, TX (US)

( * ) Notice: Subject to any disclaimer, the term of this patent is extended or adjusted under 35 U.S.C. 154(b) by 0 days.

(21) Appl. No.: 09/133,946

(22) Filed: Aug. 14, 1998

(51) Int. Cl.[7] ............................................. G06F 11/30
(52) U.S. Cl. ................................. 713/1; 713/200
(58) Field of Search ........................... 713/1, 189, 194, 713/200; 700/79

(56) References Cited

U.S. PATENT DOCUMENTS 4,593,180 * 6/1986 Narita et al. .......................... 219/492
5,353,350 * 10/1994 Unsworth et al. ................... 713/194

OTHER PUBLICATIONS

Boneh, Dan et al, "On the Importance of Checking Cryptographic Protocols for Faults", Security and Cryptography Research Group, pp. 1–14.

* cited by examiner

Primary Examiner—Thomas M. Heckler
(74) Attorney, Agent, or Firm—Jenkens & Gilchrist P.C.

(57) ABSTRACT

An integrated circuit, such as a microprocessor, which incorporates hardware mechanisms to prevent the circuitry from operating outside the proper bounds of design. The hardware circuitry prevents the microprocessor circuitry from being forced to operate at clock speeds that are greater than it is designed for, from operating at temperatures above or below that which it is designed for, and from being forced to operate at voltages that are above or below voltages that the microprocessor is designed to operate at.

12 Claims, 5 Drawing Sheets

Functional Block Diagram of the Power Management Unit

US 6,330,668 B1

INTEGRATED CIRCUIT HAVING HARDWARE CIRCUITRY TO PREVENT ELECTRICAL OR THERMAL STRESSING OF THE SILICON CIRCUITRY

BACKGROUND OF THE INVENTION

1. Field of the Invention

This Invention relates to hardware designed into silicon circuitry which prevents the circuitry from being forced to operate outside of predetermined parameters. More specifically, the present invention relates to hardware circuitry which may detect over or under voltage conditions, high- or low-speed clocks, and over or under temperature conditions. The circuitry may reset or shut down the silicon circuitry in response to such detections.

2. Description of Related Art

Microcontrollers have become commonplace in today's society. Over time microcontrollers have accommodated and provided a wide variety of solutions to various problems in the electronic and automation industries. At present, microcontrollers are beginning to be placed in devices or used as devices that perform secure transfers of money, monetary equivalents and secure information.

As a result of using microcontrollers for transferring and handling secure information and data, there are people dedicated to "breaking the code" or mathematically evaluating the secure data transfers in order to determine the secrets and proprietary techniques of the secure data transfers.

Smart cards, for example, have been "attacked" by varying the frequency to the microprocessor and the coprocessor at specific times. The frequency can be increased to produce race conditions in the integrated circuit that will make the circuit operate improperly due to the limited time between rising and falling edges of the clock signal. Calculation errors may result. A calculation error resulting from such a race condition can be compared with a similar calculation made with a good/correct result to correspondingly resolve the secret key(s) associated with the calculation and thereby defeat the security of the integrated circuit.

In the area of cryptography, an important article was written entitled "On the Importance of Checking Cryptographic Protocols for Faults", Dan Boneh, Richard A. DeMillo, Richard J. Lipton, Security and Cryptography Research Group, Bellcore, 1997(hereinafter "the Bellcore article"). The Bellcore article discusses attack techniques targeted at RSA encryption and Rabin signatures. In essence the Bellcore article indicates that from time to time hardware which performs RSA encryption calculations may introduce errors. If the errors are found or can be forced by an attacker, then the RSA code may be broken by using various algorithms. Thus, there is a need for integrated circuits which perform encryption calculations that have means for stopping or limiting the circuitry from being stressed into introducing errors into calculations.

SUMMARY OF THE INVENTION

Exemplary embodiments of the present invention overcome drawbacks of past secure microcontroller designs and integrated circuitry designs by providing hardware mechanisms which prevent a silicon circuit from operating outside its proper bounds of design. In doing so, the integrated circuit, and more particularly, the microcontroller is prevented from providing or performing an incorrect calculation result under certain conditions.

Three preferred hardware mechanisms can be incorporated into the present exemplary embodiment which will each prevent the silicon circuitry from being stressed to a point of performing an invalid task. An onboard oscillation circuit built into the silicon circuit can be used to provide a system clock and prevent race clocking conditions. An onboard temperature sensing circuit, which senses when the integrated circuit is operating outside of a predetermined temperature range, can be incorporated into the present invention to stop the integrated circuit from making an incorrect calculation due to extreme temperatures. Furthermore, a voltage sensing circuit can be incorporated into the present embodiment and sense when the voltage provided to the silicon circuit is above or below a predetermined temperature range and thereby stop the silicon circuitry from being stressed to produce an invalid or incorrect calculation result.

BRIEF DESCRIPTION OF THE DRAWINGS

A more complete understanding of the method and apparatus of the present invention may be had by reference to the following Detailed Description when taken in conjunction with the accompanying Drawings, wherein.

DETAILED DESCRIPTION OF THE EXEMPLARY EMBODIMENTS OF THE PRESENT INVENTION

Although the present invention can be incorporated into a wide variety of silicon based devices or integrated circuits, an exemplary embodiment of the present invention will be discussed in this application. The present invention is related to a microcontroller combined with an math coprocessor that may have encryption capabilities. It is important that the microcontroller is protected from being stressed via frequency, temperature and voltage variations that may force the circuit to operate incorrectly.

In essence, hardware circuitry is added to an integrated circuit to prevent the circuitry from operating outside of its proper bounds of operation. In doing so, for example, a microprocessor with a coprocessor is not stressed into outputting an incorrect value as a calculation result.

Figure 1:
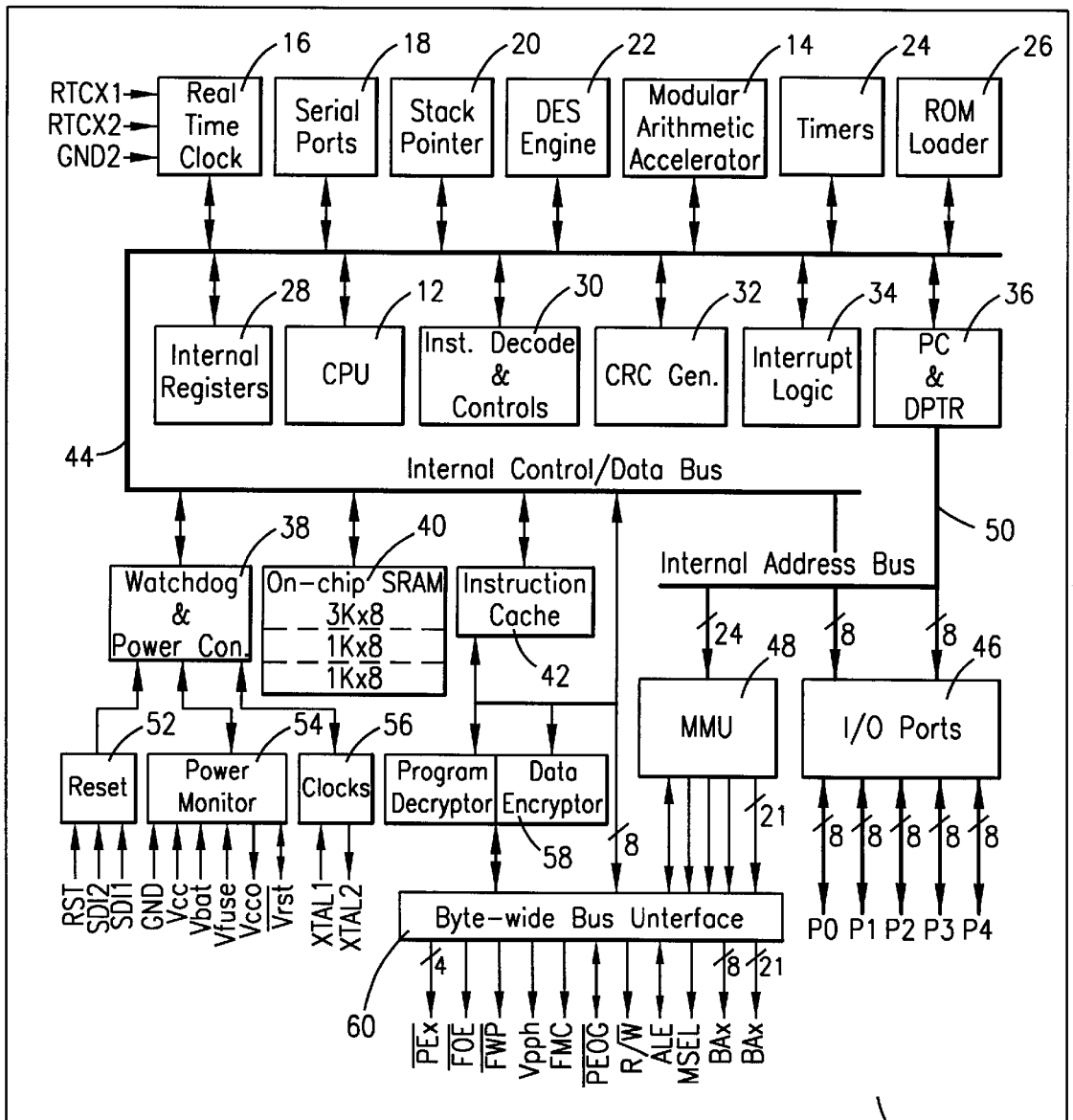
FIG. 1 is a functional block diagram of an exemplary integrated circuit comprising aspects of the present invention.

FIG. 1 depicts a block diagram of an exemplary embodiment of the present invention. More specifically, FIG. 1 depicts a functional block diagram of an microcontroller 10 which comprises, among other things, a central processing unit (CPU) 12, a modular math coprocessor 14, real time clock circuitry 16, serial ports 18, a stack pointer 20, a block-encryption (DES) engine 22, timers 24, a ROM loader circuit 26, internal registers 28, instruction and decode circuitry 30, a CRC generation circuit 32, interrupt logic 34, program and data pointer circuitry 36, a watchdog timer and power control circuit 38, on-chip memory 40, and instruction cache circuit 42 on an internal control/data bus 44. The exemplary integrated circuit 10 also comprises some I/O ports 46 and memory management circuitry 48 on internal address bus 50. FIG. 1 further depicts reset circuitry 52, power monitoring circuitry 54, clock circuitry 56, program decryption and data encryption circuitry 58, and a byte-wide bus interface 60.

In the preferred embodiment, the modular arithmetic accelerator 14 is actually a dual co-processor which supports 4096-bit exponentiation and multiplication as well as provides a system clock via a ring oscillator. The modular arithmetic accelerator may contain a 32/16-bit pipelined multiply-accumulate unit, a 16-bit adder/subtracter, a pipelined quotient calculator, a ring oscillator and control logic for exponentiation and multiplication. The system clock ring oscillator circuit is not required to be part of the modular arithmetic accelerator, but in the exemplary embodiment it made sense to make slight variations to the arithmetic circuitry to thereby also be able to produce a stable oscillation/system clock signal for the microcontroller.

The power monitor circuitry 54 is used to monitor the voltage being supplied to the exemplary microcontroller 10. If the power is too high or too low, the power monitor 54 will advise the proper circuit in the microcontroller 10 to reset the microcontroller before a potential malfunction or incorrect calculation occurs.

Although not specifically shown in FIG. 1, the power control block 38 may contain temperature sensing circuitry which will determine whether the integrated circuit is operating within a predetermined temperature range. The temperature sensing circuit is incorporated into the silicon to monitor chip temperature. If the chip temperature falls below −50 C., for example, the temperature sensing circuitry will provide a signal indicating that data in predetermined memory and cache memory locations should be destroyed. If the chip temperature rises above +100 C., for example, the temperature sensing circuitry will initiate a reset and hold the chip in reset until the temperature falls below the maximum operating temperature.

Figure 2:
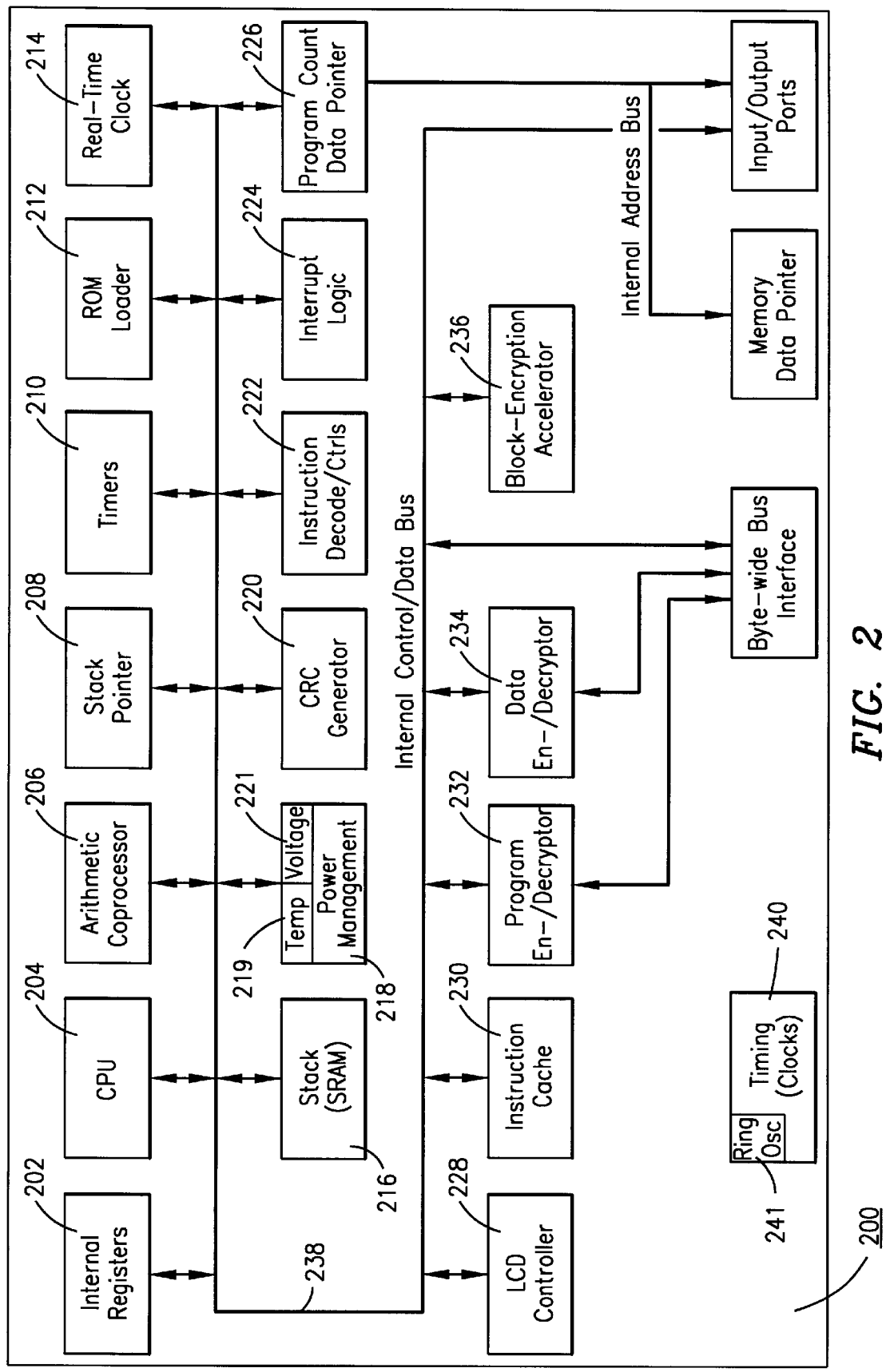
FIG. 2 is a functional block diagram of another exemplary embodiment of a integrated circuit comprising aspects of the present invention.

FIG. 2 depicts a second embodiment of the present invention. Here a secure microcontroller 200 is depicted. This microcontroller 200 comprises circuitry that enables it to perform encryption calculations. The preferred encryption calculations are for RSA encryption, but could also be for Rabin, Fiat-Shamir protocol, PGP, DES, or a multitude of public key/private key protocols. FIG. 2 depicts internal registers 202, a CPU 204, an arithmetic coprocessor 206, a stack pointer 208, timer circuitry 210, ROM loader circuitry 212, a real-time clock 214, SRAM circuitry 216, power management circuitry 218, a CRC generator 220, instruction decoding circuitry 222, interrupt logic circuitry 224, a program count data pointer circuit 226, an LCD controller 228, an instruction cache circuit 230, program en-/decryptor circuit 232, a data en-/decryptor 234, and a block-encryption accelerator 236 all of which are connected and potentially in communication with each other via an internal control/data bus 238.

A ring oscillator 241 is included in the timing clocks circuitry 240 and is used as the system clock. The ring oscillator 241 could part of the Arithmetic coprocessor in this exemplary embodiment. (Although not drawn as such in FIG. 2.) A temperature circuit 219 and voltage monitor circuit 221 may be part of the power management circuitry 218.

The CPU 204 and arithmetic coprocessor circuit 206, when running, use the ring oscillator 241. The ring oscillator 241 runs the basic clocking operations of the microcontroller 200. The ring oscillator 241 can be gated on and off as necessary to start and stop.

Other oscillation circuits 240 may be associated with the integrated circuit. For example, a real-time clock crystal oscillator may provide timing for real-time clock 214 or time stamping functions. Furthermore, still yet another oscillator may be used for I/O timing on a multiwire or one-wire bus connection to the integrated circuit. All the clocks may or may not be asynchronous with each other. The oscillator that is most important to the present invention is the one associated with the circuitry that performs the RSA or encryption calculations in the arithmetic coprocessor 206.

If the present microcontrollers 10, 200 are attacked via a frequency attack, that is, if an input clock frequency is increased to higher and higher frequencies in order to stress the circuitry to a point where race conditions would develop in the chip in an attempt to result in an improper completion of a calculation task, the present microcontroller's encryption/calculation circuitry would not be affected. Prior art circuitry may not properly terminate the task it is performing when placed in an increased frequency race condition. Under controlled conditions, prior art microcontrollers could be carefully experimented with via a frequency attack so that there results a consistent single-bit error made in the coprocessor circuit 206. Creating a single-bit error can be the most powerful attack method because a single-bit permutation is easier to implement in mathematical modeling that could decipher the encryption algorithm. Multiple-bit errors require many permutations to establish a solution as opposed to a single-bit error, one permutation relation.

If a one-bit error is established and a proper calculation is performed, then is it possible the encryption key can be mathematically determined. The error is created within a prior art microcontroller's arithmetic unit by stressing a prior art integrated circuit and then integrated circuit is allowed to perform an unstressed calculation. The two results are then compared mathematically to determine the secret codes.

The present exemplary invention, as stated above, utilizes an on-chip oscillator for providing timing and clock signals to the encryption calculation circuitry. Thus, the encryption calculations of the exemplary microcontroller 200 cannot be stressed into a race condition by an external frequency input. An oscillation circuit is monolithically on the chip and is not readily available to an attacker or pirate for adjustment. An added virtue of incorporating the oscillation circuit monolithically into the silicon is that it will virtually never oscillate at the same frequency on different chips due to impurities in the silicon and variances in the processing and manufacturing of each chip. The oscillators found on similarly manufactured chips are truly asynchronous and may vary in oscillation speed by a few percent.

Although temperature and voltage variances will be discussed later, at this point it is important to point out their effect on an on-chip oscillator. Temperature impacts the preferred oscillation circuit, a ring oscillator, in much the same way it impacts CMOS silicon circuitry in general. As temperature goes down, transistors become more efficient and can switch or operate at faster speeds. Thus, as the temperature decreases, the on-chip oscillator for the arithmetic or encryption calculation circuitry will increase its output frequency (i.e., run faster). Another advantage of the present embodiment is that the oscillation circuitry is on the same piece of silicon as the rest of the circuitry that utilizes the oscillation circuitry. As the oscillation circuitry increases its output frequency due to a temperature change, the rest of the circuitry will also be able to handle the increase of frequency and benefit from having the same temperature characteristics as the oscillation circuitry and thereby staying in "alignment" with the oscillation circuit. That is, all the transistors on the same piece of silicon will be aligned temperature wise, to handle the speed changes of the oscillator. The oscillator cannot be made, via temperature changes, to run at a speed that will out-pace or create a race condition the circuitry it provides a clocking signal to. The advantage here is that the critical encryption calculation circuitry cannot be stressed by an increase of oscillation speed when the oscillator is incorporated into the same silicon as the encryption calculation circuitry.

It should be understood that the present invention operates to thwart full-chip attack methodologies rather than pinpoint style attack methodologies of discrete circuits or areas on an integrated circuit. We note that pin-point attack methodologies tend to be very expensive and generally theoretical.

As the temperature of the silicon increases, the on-board oscillator will slow down. Of course, the increased temperature will also slow down the rest of the circuitry on the silicon and thereby track the decrease in oscillation speed.

The present exemplary microcontroller also protects itself against a voltage attack. As the supply voltage goes up, the on-board oscillator will operate faster. The speed increase is generally due to the relationship between supply voltage and the impedance of the FET transistors. The FET impedance typically decreases as the voltage across the FET increases. As a result, an increase of voltage will increase the frequency of the oscillator. Again the voltage relationship will track both the oscillation circuitry and the other circuitry in the integrated circuitry.

From a "control of frequency" standpoint an on-board ring-oscillator which provides a clock signal to the encryption related circuitry 206, 14 provides the benefit of effectively neutralizing "attack methodologies" that focus on attempting to control the frequency of a vulnerable portion of the circuitry 206, 14, 12. Generally, in the technical area of encryption circuitry, an attempt to decode data or learn the encryption keys (i.e., an attack) is performed by focusing or creating an error in the encryption calculations within the ALU or coprocessor circuitry. The most vulnerable portion of any circuit is the longest path that data must take or the longest chain of calculations that data must advance through in a single clock cycle. Generally, the longest path or chain of calculations takes place in the coprocessor circuitry 206. When performing an encryption calculation, such as a modulo math calculation in the math coprocessor 206 the data traversing the longest path through the coprocessor 206 is the most vulnerable to an attack from a user who is attempting to break the encryption code. To confuse an attacker, the preferred embodiment incorporates an oscillator circuit which is designed to substantially look like the math coprocessor circuitry.

The preferred oscillator circuit is a ring oscillator. By making the ring oscillation circuit and the math coprocessor circuitry similar in design, the temperature and voltage characteristics will track each other more closely than if the circuits were substantially different in design. This is not to say that the on-board oscillation circuit must be substantially similar to the circuitry containing the longest data path, but it is preferred. The object is not to have the oscillator outrun the slowest circuit to which it provides clocking signals to.

Figure 3:
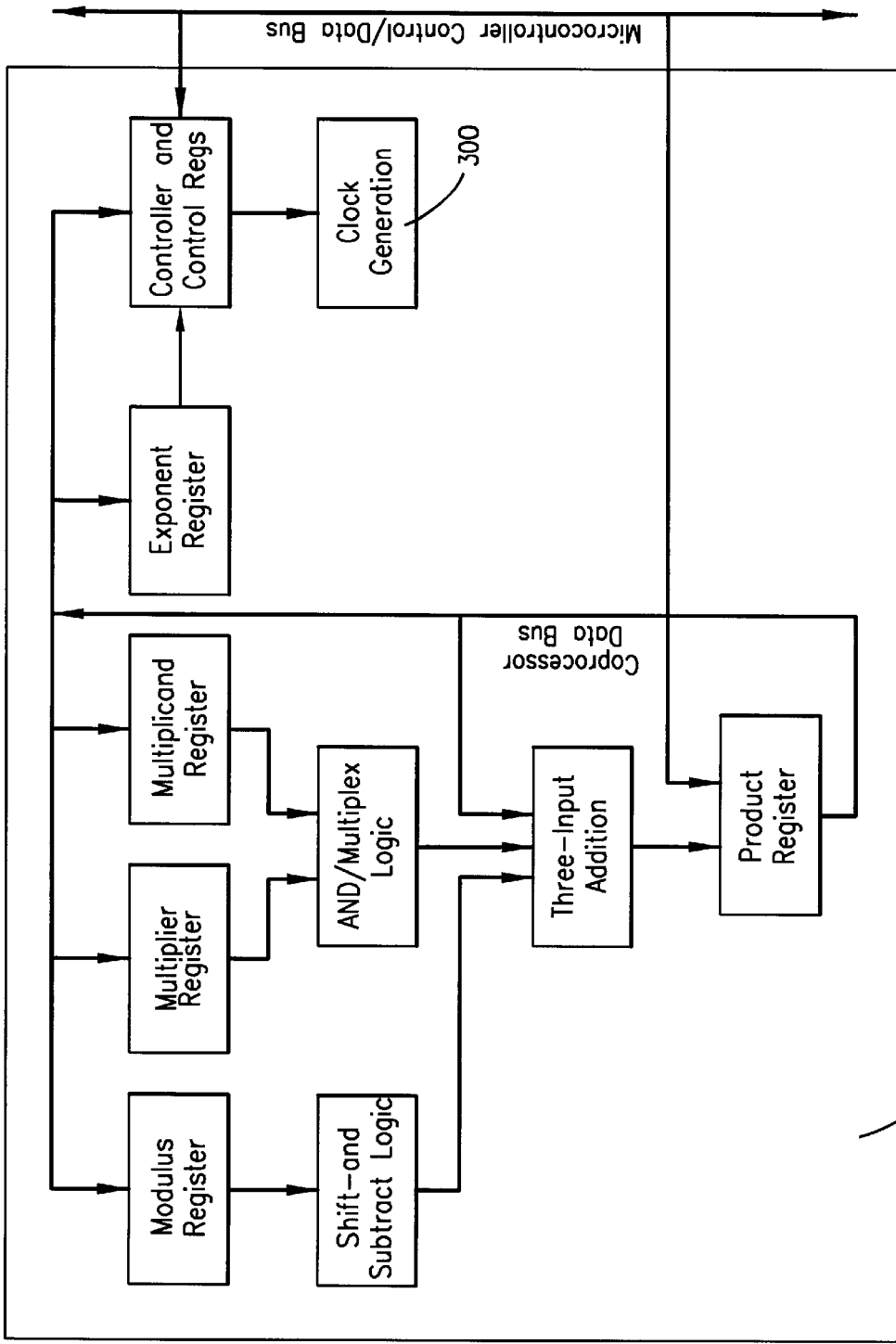
FIG. 3 is block diagram of a arithmetic coprocessor associated with an exemplary integrated circuit.

In the exemplary embodiment, it is possible for the onboard oscillation circuitry to be designed similarly to the math coprocessor circuit because the coprocessor is essentially a ripple-carry adder circuit (see FIG. 3). A ripple-carry adder circuit is generally a path of gates that when fed back on itself will look like a ring oscillator (see FIG. 4) wherein the adder portion is used, generally, as a delay path. The circuit is not a standard design for a ring oscillator, but it operates as a ring oscillator. The main importance is that the ring oscillator's frequency output cannot be substantially controlled from outside the integrated circuitry in such a way to speed up or slow down the math coprocessor to thereby attempt to force a calculation error.

Focusing on voltage, the exemplary embodiment preferably is capable of thwarting a "voltage attack". A voltage attack is designed to get the microcontroller to make a mistake due to a supply voltage change. The mistake may provide an attacker with enough information to discern the secret keys used in the encryption of data or to decode the data.

Generally, a voltage attack may be made independent of clock frequency. A microcontroller is designed to operate at a particular voltage or voltages. For example, a general purpose microcontroller, like an 8051 device, may be able to operate at 5 volts at 4 MHZ or at 3 volts at 2 MHZ. An attacker may attack a device by lowering its operating voltage, given a particular clock frequency, to get the device to make a mistake or operate improperly. An attacker can take this attack further by only dropping the supply voltage low enough so that the device is not losing data, and then freeze the clock. (Most devices use CMOS technology which is purely static. Static CMOS is a good selling feature, but operates in this attacker's favor.) The device is stopped in a static state and then the attacker lowers the supply voltage down to a certain point and then brings it back up. The attacker is trying to create a repeatable error by toggling a cell in the coprocessor. If this process is done under carefully controlled conditions a single bit error may be reproducible and predictable. A variety of attacks can be developed. For example, an attacker may switch the voltage from high to low then count clock cycles and then lower the voltage, etc.

In the present exemplary embodiment, a voltage attack is thwarted via a band-gap circuit or voltage window circuit combined with reset capabilities. Usually a band gap circuit is utilized to reset a microcontroller if the voltage is too low and the clock is running. In the present exemplary embodiment the band gap circuitry will reset the device when the clock is or even is not running and when the voltage drops below a predetermined voltage. The band gap circuit operates whether or not the clock is operating. When the device is reset, any calculation data in the coprocessor 14, 206 is destroyed. The predetermined voltage is set at a voltage above where the coprocessor may miscalculate data. Instead of producing a potential single bit error, which the attacker wants, all the bits are reset to zero.

An added advantage of the preferred embodiment is that an onboard oscillator exists to carry out the reset function. That is, even if an external clock is being used to clock data in and out of the device and an external power supply is used to power the device, the combination of the internal oscillator and the band gap circuit can be used to reset the part if the voltage supply drops below a particular voltage. It is important to point out that an onboard oscillator is useful against a low voltage attack but is not necessary. The coprocessor can be reset without the aid of the onboard oscillator as well.

A high-voltage attack is a slightly different matter than a low voltage attack. Stressing the voltage upward can cause problems in the silicon circuitry of the microcontroller. One object of a high-voltage attack would be to increase the frequency of the switching within the circuitry to get a gate to switch too soon and encourage an incorrect calculation. An onboard oscillator circuit, such as the ring oscillator of the present exemplary embodiment, will help thwart that problem by providing a usable clock frequency regardless of the voltage. Furthermore, an exemplary embodiment may have a high-voltage detection circuit which can protect the chip from a high-voltage frequency relationship attack. When the supply voltage is too high, or above a predetermined voltage, the device will reset and destroy any calculation data in the coprocessor portion of the microcontroller.

Thus, in an exemplary embodiment of the present invention, a voltage window with a high and low setting, for example 6.5 volts and 2.5 volts can be connected to reset the math coprocessor, arithmetic and/or, microcontroller circuitry if the voltage is above or below the voltage window settings. Such a circuit would be found in the power monitoring circuitry 54, 218.

If the voltage is too high the device may begin to malfunction and thereby produce a calculation error. Of course, if the voltage is much to high irreparable harm will result.

In an exemplary microcontroller, when the voltage goes below a predetermined voltage such as 2.5 volts, three things happen. First, a device reset occurs, that is, all states that are temporary states on the chip should be reset; second, all states that are permanent states in memory or a volatile state should be backed up by a back-up power source such as a battery; and third, the clock will be stopped. Similarly, if the supply voltage in an exemplary microcontroller goes above a predetermined voltage first, a reset of all temporary states occurs and second, all states that are permanent and volatile, such as SRAM, are switched to being battery backed so that they will not be changed or destroyed by an overvoltage; and third the clock is stopped. At a predetermined overvoltage, the device should be allowed to destroy itself so as to be nonfunctional.

With respect to a thermal attack, first theoretically the charge on a RAM cell can be preserved and detected if a device is quickly frozen in liquid nitrogen. Secondly, a thermal attack can be viewed as similar to a voltage attack in that the device is stressed. As the temperature increases the elements of the device will speed up. The object of the second thermal attack is to speed or slow the part so that it will make a mistake. A thermal attack can be combined with a voltage or a frequency attack.

In the exemplary embodiment, a temperature sensing circuit is incorporated into the silicon circuitry. The temperature sensor senses, for example, when the temperature drops below −100° C. When the temperature drops below the predetermined temperature, the temperature sensor will send a trip signal to erase the static RAM instantly. Any secret keys or other information that should not be extracted from the memory will be destroyed. The temperature sensing circuitry can be designed to trigger at any predetermined temperature and can be set to erase any memory location. latch, flip-flop, register, etc., when triggered. The object here is to destroy "secret" information prior to the memory location being frozen.

Furthermore, an exemplary device can also have an operating temperature window in order to thwart an attack that attempts to speed up or slow down the device using temperature. The temperature window will operate similarly to the voltage window described above. That is, instead of monitoring voltage, the temperature window will check to make sure the device is operating in a temperature range between, for example, −50° C. and 90° C. There is no reason for perfect accuracy in the temperature sensor so +/−5° C. to 10° C. accuracy is fine.

If the temperature goes outside the temperature window, the device will reset and the on-board oscillator will stop clocking the device. It is very important that the temperature sensing circuit uses a minimal amount of power. The preferred present exemplary embodiment is battery backed. The battery is preferably a very small battery, thus, the temperature sensing portion of the circuitry must be very low power and consume on the average, less than 100 picoamps. On the other hand, the temperature sensing device must sense temperature often enough to protect the device from a temperature attack.

In the preferred embodiment, the temperature sensing circuitry will use less than 100 picoamps on average. This is done by cycling the temperature sensing circuitry on and off. On a first clock cycle the temperature sensing circuitry is powered up, warmed up and a temperature reading is taken. On a second or next clock cycle the temperature sensed result is latched and action is taken accordingly. If the temperature is too cold (below a predetermined temperature), the RAM memory is erased instantly. If the temperature is outside the temperature window, the device will reset any calculation being performed and the clocking oscillator will stop oscillating.

In order to save energy the temperature sensing circuitry is turned on for short periods of time 2 to 3 clock cycles and left off for long periods of time ranging from a 100th of a second to a minute. The result is that the temperature sensing device averages a power requirement in the 100 picoamp range instead of the 100 microamp range.

The temperature-sensing circuitry must be operated primarily off of battery power because a microcontroller may rarely be powered up. Thus, a designer cannot depend on energy from outside the microcontroller because the microcontroller may be infrequently used. Ideally, the exemplary embodiment will have an operating battery life of about 10 years±2 years. Circuitry can be added to the microcontroller to place it in reset if the backup-battery power is removed.

As a result of the above described temperature sensing capabilities, voltage sensing capabilities and the on-board system clock, the present exemplary microcontroller moves closer to becoming an error free device that is very difficult to pirate. The encryption capabilities of an exemplary microcontroller are also moved toward being more secure.

Referring now to FIG. 3, a functional block diagram of an exemplary math coprocessor 206 is depicted. The internal clock generation block 300 can be any suitable clock generation circuit that does not require connections to an external crystal or other external oscillation source. In the exemplary device the clock generation circuit is a ring oscillator. The output of the ring oscillator should, at least, provide the clocking signals for the coprocessor circuitry and possibly the CPU circuitry. Furthermore, it is not required that the internal clock generation circuit 300 be integrated with the math coprocessor circuit. Indeed, the clock generation circuit can be anywhere on the integrated circuit so long as it is incorporated as part of the microcontroller or microprocessor integrated circuitry.

Figure 4:
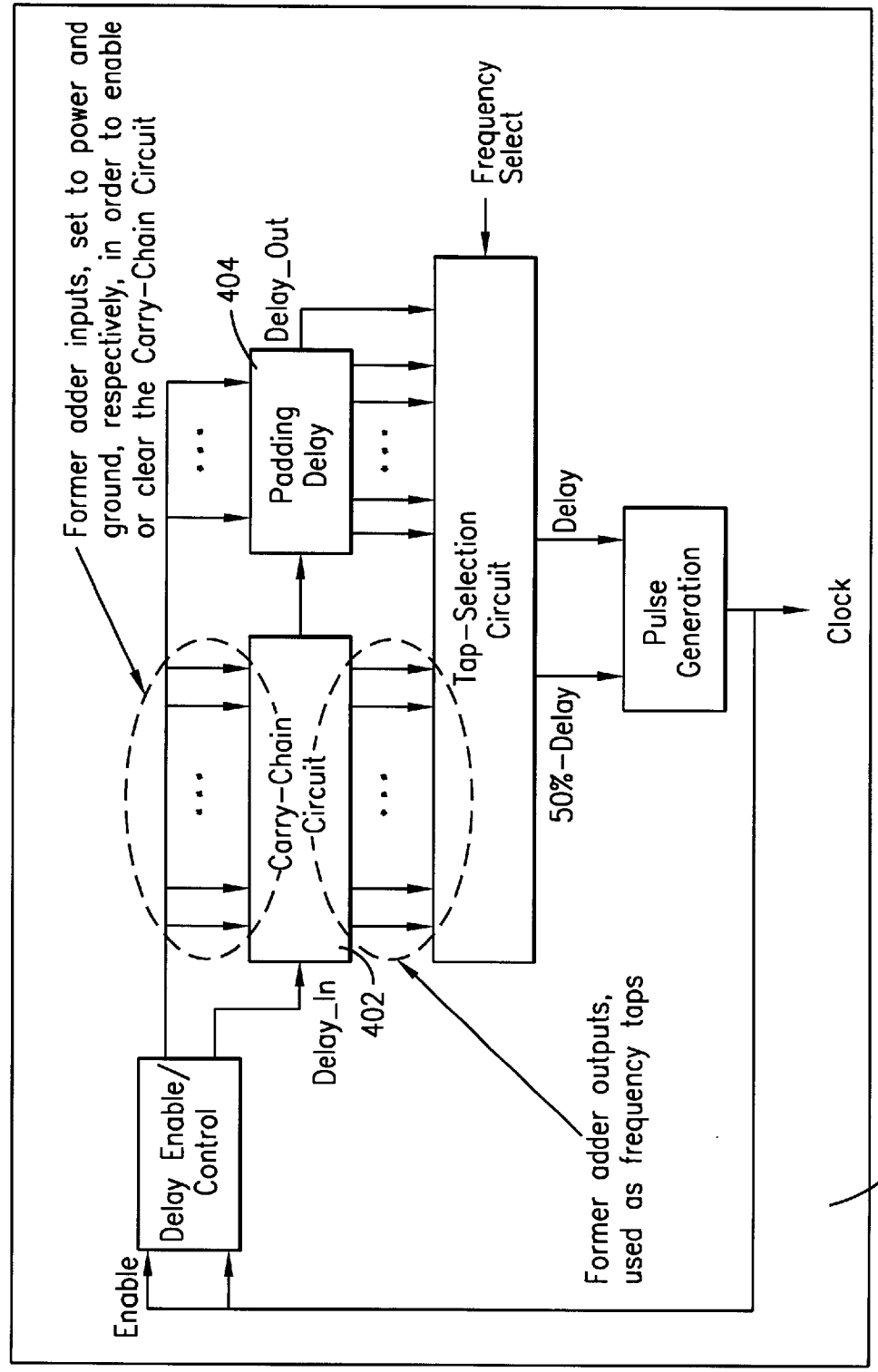
FIG. 4 is a block diagram of an exemplary oscillation/ system clock circuit built into an exemplary embodiment of the present invention.

FIG. 4 depicts an exemplary oscillation/clock circuit 300. It is important that the oscillation/clock speed of the oscillation circuit 300 never exceed the fastest clock rate that the math coprocessor circuit 206 can handle. In the exemplary oscillation circuit, a ring oscillator is implemented as a carry-chain circuitry 402 that is similar to that found in the exemplary coprocessor circuitry. Additional delay or padding circuitry 404 is incorporated into the circuit to make the progation time of the ring oscillator longer than that of the exemplary coprocessor circuitry 206.

Figure 5:
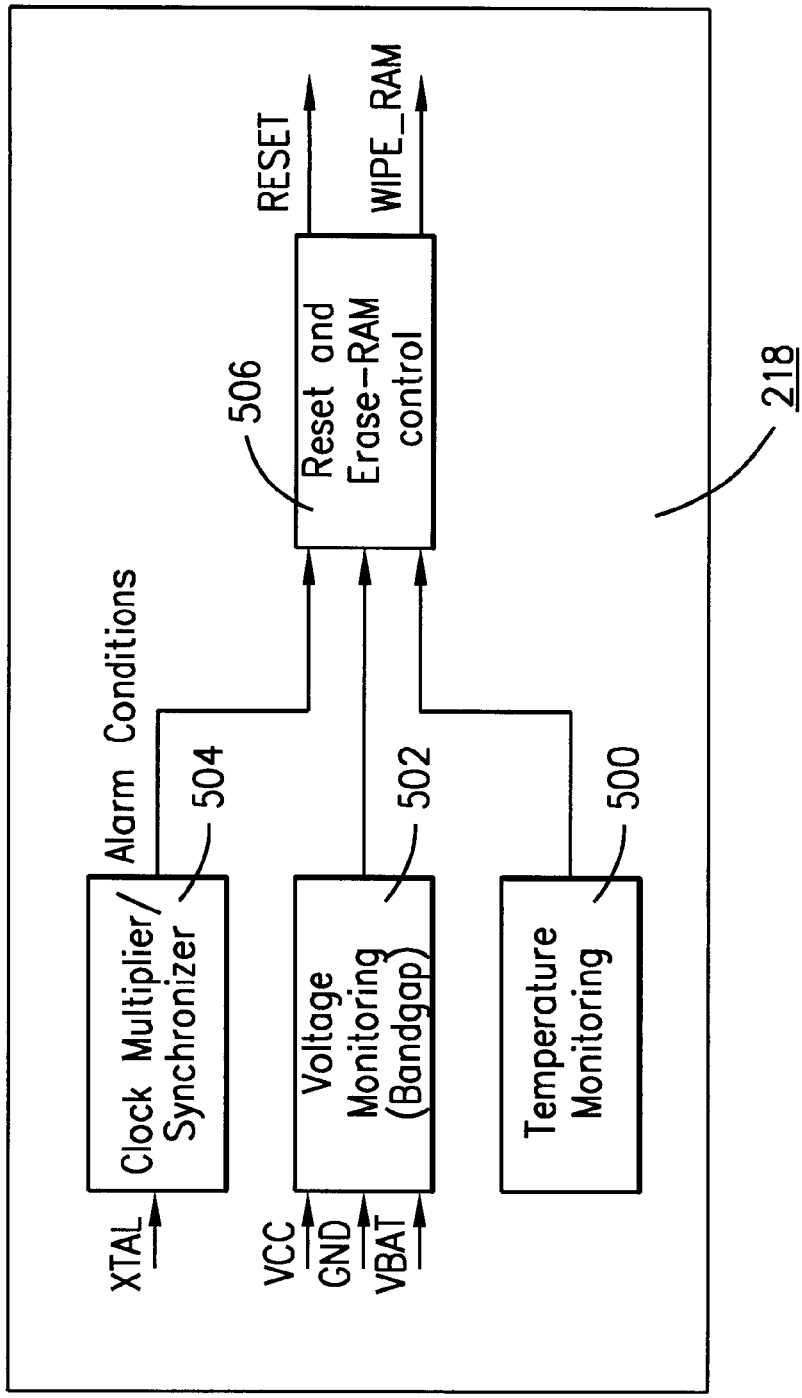
FIG. 5 is a block diagram of an exemplary control circuit incorporated into a present exemplary embodiment.

FIG. 5 depicts an exemplary block diagram of a power management circuit 218 which includes a temperature monitoring block 500. The temperature monitoring block 500 includes a temperature window circuit to detect predetermined high and low temperatures. The temperature monitoring circuitry also determines if the temperature is an extremely cold temperature, such as liquid nitrogen. A voltage monitoring block 502 is also shown. The voltage monitoring block is connected to ground (GND), power (VCC), and the battery backup source (VBAT). The voltages are monitored with a band-gap circuit voltage window circuit or other voltage sensing circuity.

A clock multiplier/synchronizer block 504 is shown. The clock multiplier/synthesizer can be utilized to monitor an external clock frequency. Each of the monitoring circuits provide an alarm signal to the reset and erase-RAM control block 506, if a frequency, voltage or temperature is detected outside of a predetermined range. The reset and erase control block 506 provides reset and wipe RAM signals for initiating a microcontroller reset, initiating a RAM-erase function or both depending on the alarm conditions.

As is clearly seen, the present invention is significant in the microcontroller area of technology. The present invention is believed to be especially effective when configured an employed as described herein. However, those skilled in the art will readily recognize that numerous variations and substitutions may be made in the invention and its use and configuration to achieve substantially the same results as achieved by the embodiments and, in particular, the preferred embodiment described herein. Each variation is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. An integrated circuit comprising:

general circuitry for performing a predetermined function;

protection circuitry, connected to said general circuitry, for resetting said general circuitry if said general circuitry is forced to operate outside of at least one predetermined parameter, said protection circuitry comprising:

control circuitry for providing said resetting signal to said general circuitry;

voltage-sensing circuitry for sensing an over voltage or under-voltage condition;

temperature sensing circuitry for sensing an under temperature or over-temperature, condition; and an internal system clock which does not connect an off chip oscillation source; said voltage-sensing circuitry and temperature-sensing circuitry being connected to said control circuitry.

2. The integrated circuit of claim 1, wherein said general circuitry is a microcontroller circuit.

3. The integrated circuit of claim 1, wherein said general circuitry is at least one of an arithmetic logic unit circuit, a math coprocessor circuit, and a circuit designed to perform encryption calculations.

4. The integrated ciruitry of claim 1, wherein said temperature-sensing circuit is battery backed.

5. A microcontroller integrated circuit comprising:

a central processing unit;

an arithmetic coprocessor connected by a bus to said central processing unit;

an on-board oscillation circuit for providing clock signals to at least said arithmetic coprocessor;

a temperature-sensing circuit for providing a reset signal to said arithmetic coprocessor if the temperature is outside of a predetermined temperature window and for providing an erase signal at least one memory location if the temperature is below a predetermined temperature; and a voltage-sensing circuit for providing a reset signal to said arithmetic coprocessor if a supply voltage is outside of a predetermined voltage window.

6. The microcontroller integrated circuit of claim 5, wherein said microcontroller is designed for use with encrypted data.

7. The microcontroller integrated circuit of claim 5, wherein at least a part of said temperature-sensing circuit is battery backed.

8. The microcontroller integrated circuit of claim 5, wherein said on-board oscillation circuit is designed similarly to said arithmetic coprocessor.

9. The microcontroller integrated circuit of claim 5, wherein said arithmetic coprocessor is a modulo-math coprocessor circuit.

10. An integrated circuit capable of performing encryption calculations, said integrated circuit comprising:

temperature-sensing circuitry for sensing temperature and providing a first reset signal if the temperature is outside of a predetermined temperature range;

voltage-sensing circuitry for sensing a supply voltage and providing a second reset signal if the supply voltage is outside of a predetermined voltage range;

an on-board oscillation circuit for providing a clock signal to at least a portion of said integrated circuit, said oscillation circuit does not receive oscillation signals originating from off said integrated circuit, said first reset signal and said second reset signal being utilized to reset at least a arithmetic circuit on said integrated circuit.

11. The integrated circuit of claim 10, wherein said arithmetic circuit performs data encryption calculations.

12. The integrated circuit of claim 10, wherein said temperature-sensing circuit provides a erase memory signal if said temperature is below a predetermined temperature.

* * * * *